United States Patent
Bergeon et al.

(10) Patent No.: US 6,659,078 B2
(45) Date of Patent: Dec. 9, 2003

(54) INTERNAL COMBUSTION ENGINE OPERATING PARAMETER CONTROL WITH NVH FEEDBACK

(75) Inventors: Milton Scott Bergeon, Dearborn, MI (US); William Woebkenberg, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 10/063,399

(22) Filed: Apr. 18, 2002

(65) Prior Publication Data

US 2003/0196637 A1 Oct. 23, 2003

(51) Int. Cl.$^7$ .............................. F02M 3/00; G06F 19/00
(52) U.S. Cl. .............................. 123/339.14; 123/192.1; 123/436; 701/111
(58) Field of Search .......................... 123/192.1, 494, 123/339.14, 436; 701/111

(56) References Cited

U.S. PATENT DOCUMENTS

| | | | | |
|---|---|---|---|---|
| 5,720,257 A | * | 2/1998 | Motose et al. | 123/339.14 |
| 6,167,860 B1 | | 1/2001 | Tsukamoto | 123/192.1 |
| 6,286,473 B1 | * | 9/2001 | Zaremba | 123/192.1 |
| 6,427,112 B1 | * | 7/2002 | Kostun | 701/111 |

* cited by examiner

*Primary Examiner*—Thomas N. Moulis
(74) *Attorney, Agent, or Firm*—Dykema Gossett PLLC; Carlos L. Hanze

(57) ABSTRACT

A method and system for controlling an automotive internal combustion engine having NVH feedback uses NVH signals which are processed and compared with human threshold values to determine whether an engine control parameter such as idle speed needs to be adjusted so as to mitigate unwanted noise, vibration, and harshness.

17 Claims, 2 Drawing Sheets

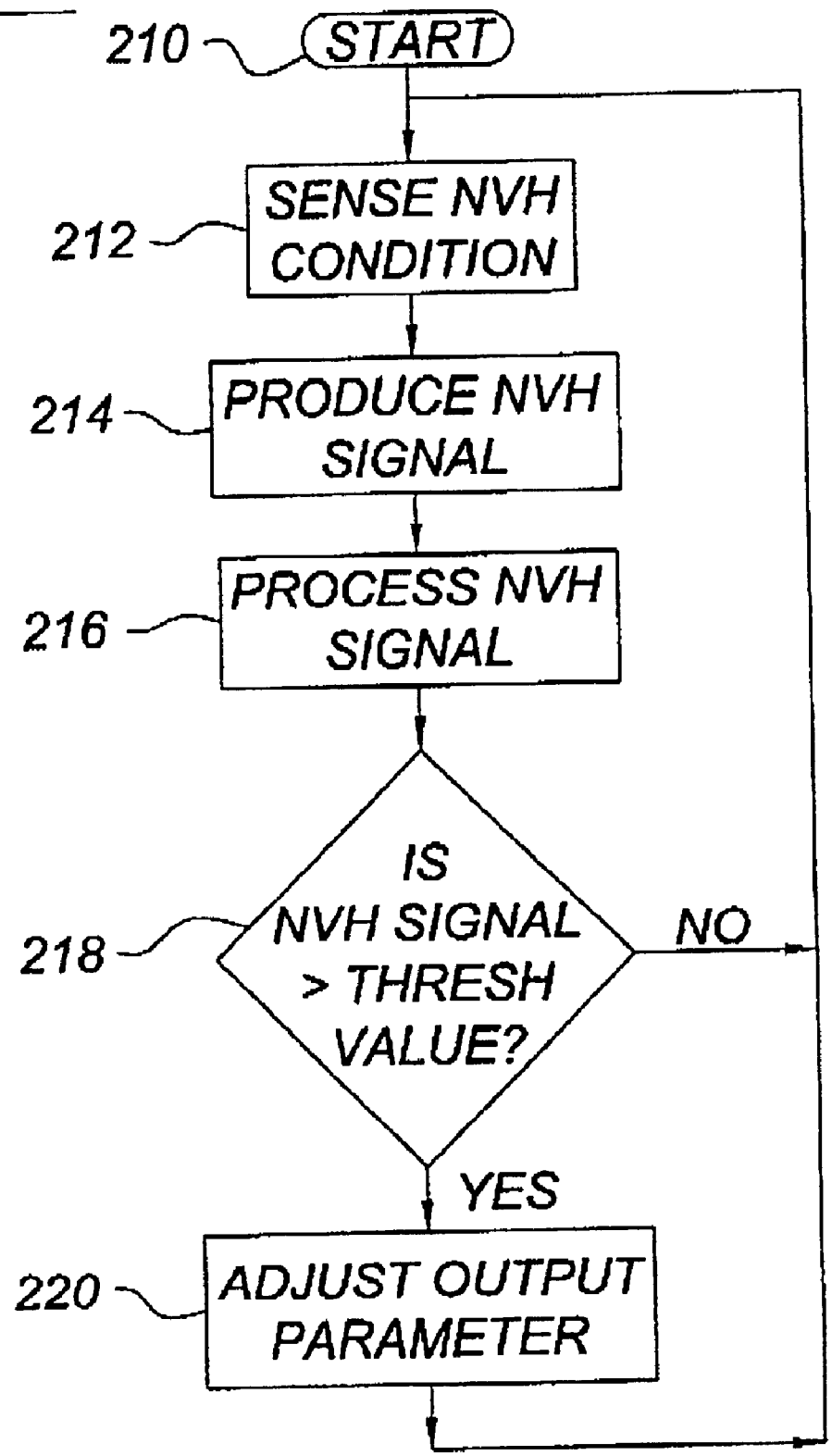

INTERNAL COMBUSTION ENGINE OPERATING PARAMETER CONTROL WITH NVH FEEDBACK

BACKGROUND OF INVENTION

1. Field of the Invention

The present invention relates to a system for controlling an internal combustion engine, in which the speed of the engine and other operating parameters are governed according to the presence of noise, vibration, or harshness ("NVH") conditions which are sensed by appropriate sensors and processed by the vehicle's engine controller. It should be noted in this regard that the presence of an NVH condition does not necessarily indicate that the vehicle or engine is running improperly. For example, as noted below, certain objectionable engine vibrations may occur without knocking operation.

2. Background Information

As vehicle powertrains and body structures become increasing refined, it has become necessary to treat engine-related vibrations more carefully. Particularly with premium automobiles, it is imperative that minimum objectionable vibration and noise be evidenced by the vehicle's power plant. U.S. Pat. No. 6,167,860 illustrates a system in which failure of a electroelastic vibration isolator engine mount is masked by the use of an idle speed control; there is no attempt to determine whether any particular vibration has sufficient strength to be objectionable to a person occupying the vehicle.

The present invention is very different from the '860 patent, by making the control of idle speed or other engine operating parameters a function of noise, vibration, harshness or other objectionable NVH conditions which may be sensed by the human operator or other occupants of a motor vehicle. In essence, a system and method according to present invention allows engine idle speed control to be a function of the driver's projected physical response.

SUMMARY OF INVENTION

A system for controlling the idle speed or other operating parameter of an internal combustion engine in a motor vehicle includes an engine controller for receiving a plurality of engine operating parameters and for providing an idle speed control signal in response to the values of the parameters. At least one sensor is operatively connected with the controller for the purpose of sensing an NVH condition capable of being sensed by an occupant of the vehicle. The sensor produces an NVH signal in response to the sensing of the NVH condition. A signal processor operatively associated with controller receives the NVH signal. The signal processor also comprises a comparator for comparing characteristics of the NVH signal with a predetermined human threshold value. The controller uses the result of the comparison by the processor as one of a plurality of operating parameters for providing an idle speed control signal.

According to an aspect of the present invention, an NVH condition may comprise a vibration which may be sensed by the occupants of the vehicle, such as vibration of a vehicle structure such as a floor pan or other body panel or a seating component such as a seat track. Alternatively, the NVH condition may comprise a noise which may be sensed by occupants of the vehicle.

According to another aspect of the present invention, the signal processor, which may be housed within the engine controller itself, may comprise a filter operating in the time domain or filter operating in the frequency domain or both.

According to yet another aspect of the present invention, a method for controlling the idle speed or other operating parameter of an internal combustion engine installed in an automotive vehicle comprises the steps of sensing a NVH condition which is sensible by an occupant of the vehicle, producing an NVH signal corresponding to the sensed NVH condition, processing the NVH signal, and comparing the value of a characteristic of the processed NVH signal with a predetermined threshold value.

A method according to the present invention will alter idle speed or other controlled engine operating parameter in the event the value of a characteristic of the signal generated by an NVH sensor exceeds a threshold value. As before, an NVH condition according to present method may be a vibration which may be sensed by an occupant of the vehicle. Processing may comprise filtering of the NVH signal in the time domain or frequency domain followed by the comparison of the filtered signal with a threshold value, and correction of the idle speed or other operating parameter in the event that the threshold value is exceeded.

BRIEF DESCRIPTION OF DRAWINGS

FIG. 2 is a flow chart illustrating a method according to present invention.

DETAILED DESCRIPTION

Figure 1:
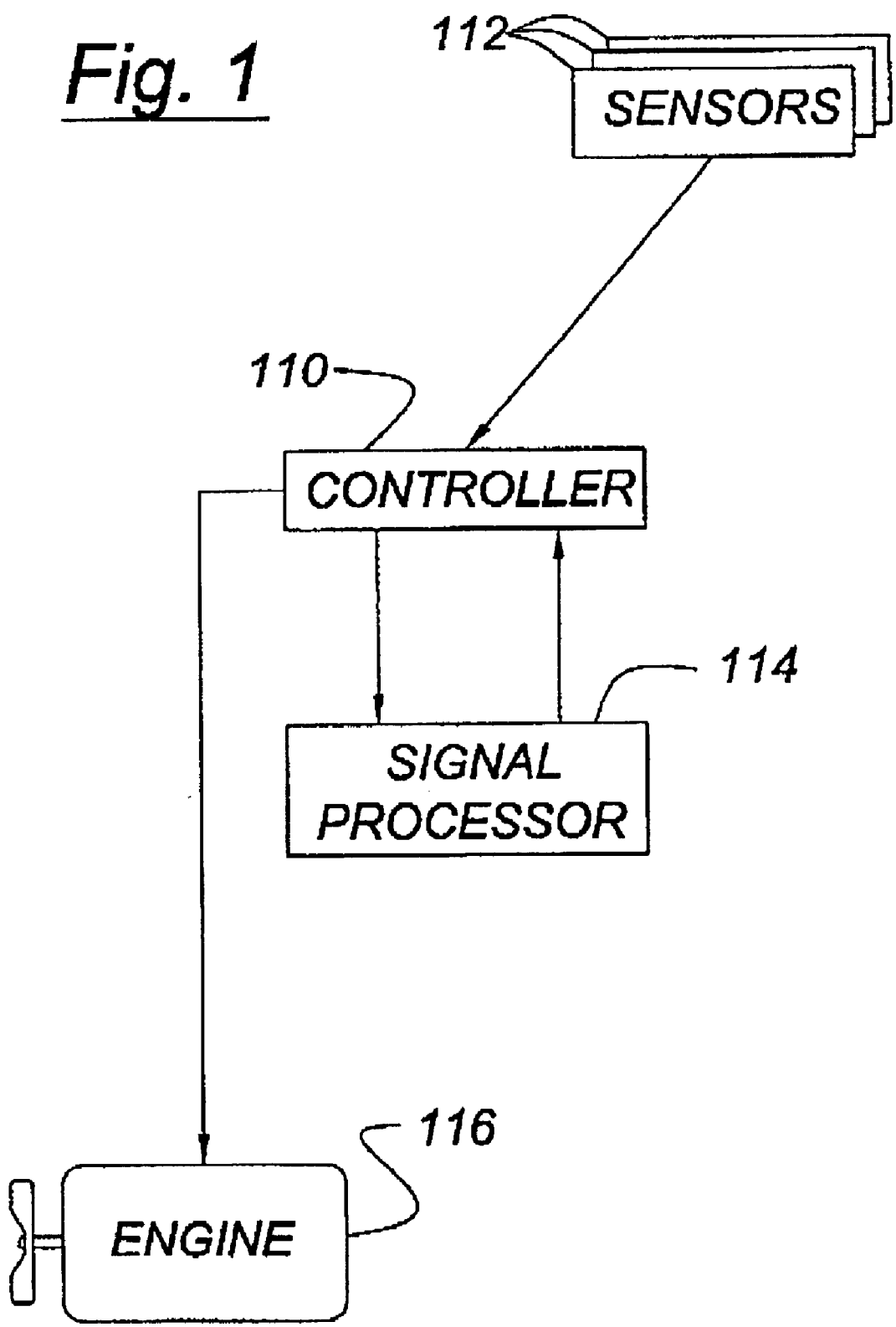
FIG. 1 is a schematic representation of a internal combustion engine having an idle speed control with NVH feedback according to the present invention.

As shown in FIG. 1, engine controller 110 which may comprise any of the plurality of electronic engine controllers known to those skilled in the art and suggested by this disclosure, receives inputs from a variety of sensors 112. These sensors, which are of the type known to those skilled in the art, may include sensors for determining crankshaft position, EGR valve position, engine speed, crankshaft speed, camshaft position and other sensors. Moreover, according to the present invention, sensors 112 may comprise sensors capable of sensing an NVH condition. Such sensors include, without limitation, accelerometers, strain gauges applied to moving parts and microphones and other devices capable of sensing vibration and audible and sub-audible sound pressure level variation.

NVH signals arising from sensors 112 are communicated to controller 110, and then processed by signal processor 114. Signal processor 114 may comprise a filter which could be of the time or frequency domain variety or both, or another type of signal processor, digital and/or analog. In any event, according to FIG. 2, once an NVH condition has been sensed at block 212, an NVH signal is produced at step 214 and processed at step 216 by filtering, as noted above. At step 218, a character of the NVH signal, such as sound pressure level as a function of time, is compared with a human threshold value. For example, at step 218, a processed signal relating to noise within vehicle's cabin may be compared with a sound pressure level or noise threshold value at which humans will have an adverse response. If the value of the processed NVH signal exceeds the predetermined human threshold value at step 218, the program moves to step 220, wherein the idle speed may be adjusted either up or down to reduce the perceived noise within the vehicle's cabin. Controller 110 will adjust the idle speed based not only upon the value of the processed NVH signal, but also upon the values of the other engine operating parameters reported by other of sensors 112.

If the NVH condition being sensed is vibration of the seat track of the vehicle upon which the driver or passengers of the vehicle is seated, or for that matter, any other vibration, the filtered vibration signal may be compared with a human threshold value at step 218 and the engine speed increased or decreased accordingly at step 220 so as to move operation of the engine out of the regime within which the seat track is excited so as to either reduce or eliminate an objectionable vibration.

If the answer to the question posed in step 218 regarding the threshold comparison is "no", then step 218, the routine continues to loop, beginning once again with block 212.

According to another aspect of the present invention, step 220 may comprise adjustment of not only engine idle speed, but other engine output parameters as well. Thus, if the engine exhibits, for example, the phenomenon termed "dominant cylinder firing", which is characterized by one cylinder having a statistically greater firing pressure than the other cylinders, an unwanted vibration may result. This vibration may be corrected by retarding the spark timing for the particular cylinder which exhibits the greater firing pressure. And, this adjustment may be needed to achieve a desired level of NVH even though the cylinder exhibiting the dominant firing characteristic is not operating in a knocking condition. Those skilled in the art will appreciate in view of this disclosure that dominant cylinder firing may be sensed by, and be objectionable to, the driver or passengers of a vehicle even without knocking operation.

Dominant cylinder firing may be sensed by including within the array of sensors 112 a crankshaft position sensor and a related program in controller 110 for determining crankshaft acceleration. Such programs, which are known to those skilled in the art and suggested by this disclosure, are useful for detecting a cylinder exhibiting abnormally high or low firing pressure, so that a system and method according to the present invention may be implemented to address any resultant unacceptable NVH condition.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed is:

1. A system for controlling at least one output parameter of an internal combustion engine in a motor vehicle, comprising:
   an engine controller for receiving a plurality of engine operating parameters and for providing an output parameter control signal in response to the values of said operating parameters;
   at least one sensor operatively connected with the controller, for sensing an NVH condition capable of being sensed by an occupant of the vehicle, with said sensor producing a NVH signal in response to the sensing of said NVH condition; and
   a signal processor operatively associated with said controller, for receiving said NVH signal, with said signal processor comprising a comparator for comparing a characteristic of the NVH signal with a predetermined human threshold value, and with the controller using the result of said comparison as one of said plurality of operating parameters for providing said output parameter control signal.

2. A system according to claim 1, wherein said NVH condition comprises a vibration which may be sensed by the occupants of the vehicle.

3. A system according to claim 2, wherein said vibration comprises vibration of a structure of said vehicle.

4. A system according to claim 3, wherein said vibration comprises vibration of a seating component within said vehicle.

5. A system according to claim 3, wherein said vibration comprises vibration of a body panel of said vehicle.

6. A system according to claim 1, wherein said NVH condition comprises a noise which may be sensed by the occupants of the vehicle.

7. A system according to claim 1, wherein said signal processor further comprises a filter operating in the time domain.

8. A system according to claim 1, wherein said signal processor further comprises a filter operating in the frequency domain.

9. A system according to claim 1, wherein said output parameter comprises the idle speed of the engine.

10. A system according to claim 1, wherein said output parameter comprises the spark timing for at least one of the cylinders of the engine.

11. A method for controlling an output parameter of an internal combustion engine installed in an automotive vehicle, comprising the steps of:
    sensing an NVH condition which is sensible by an occupant of the vehicle;
    producing an NVH signal corresponding to the sensed NVH condition;
    processing the NVH signal;
    comparing the value of a characteristic of the processed NVH signal with a predetermined human threshold value; and
    altering the output parameter in the event that the value of said characteristic exceeds said threshold value.

12. A method according to claim 11, wherein said NVH condition is a vibration which may be sensed by an occupant of the vehicle, with said processing comprising filtering said NVH signal in the time domain, followed by comparison of the filtered signal with a threshold vibration value.

13. A method according to claim 11, wherein the step of processing the NVH signal comprises filtering the NVH signal in the frequency domain and comparing the filtered signal with a threshold value.

14. A method according to claim 11, wherein said NVH condition is a noise which may be sensed by an occupant of the vehicle, with said processing comprising filtering said NVH signal in the time domain, followed by comparison of the filtered signal with a threshold noise value.

15. A method according to claim 11, wherein said output parameter comprises the idle speed of the engine.

16. A method according to claim 11, wherein said output parameter comprises the spark timing of at least one of the cylinders of the engine.

17. An article of manufacture for operating an internal combustion engine having a plurality of idle speed operating states, the article of manufacture comprising: a computer usable medium; and a computer readable program code embodied in the computer usable medium for controlling an engine output parameter as a result of an NVH condition sensed by one or more sensors connected with said computer usable medium, and with a characteristic of the NVH condition exceeding a human threshold value.

\* \* \* \* \*